United States Patent [19]
Antohi

[11] Patent Number: 5,896,747
[45] Date of Patent: Apr. 27, 1999

[54] VEHICULAR ABSORPTION AIR CONDITIONING PROCESS AND SYSTEM UTILIZING ENGINE COOLANT WASTE HEAT

[76] Inventor: Valentin Antohi, 1120 Governor's Dr., Winthrop, Mass. 02162

[21] Appl. No.: 08/690,636

[22] Filed: Jul. 30, 1996

Related U.S. Application Data

[60] Provisional application No. 60/001,743, Aug. 1, 1995.

[51] Int. Cl.$^6$ .................................................. F25B 15/00
[52] U.S. Cl. ............................ 62/101; 62/323.2; 62/476
[58] Field of Search ................... 62/323.2, 476, 62/101, 148, 483, 488, 497

[56] References Cited

U.S. PATENT DOCUMENTS

| | | | |
|---|---|---|---|
| 3,661,200 | 5/1972 | McNamara | 165/42 |
| 4,164,128 | 8/1979 | Newton | 62/105 |
| 4,307,575 | 12/1981 | Popinski | 62/148 |
| 4,337,625 | 7/1982 | Wilkinson | 62/79 |
| 4,523,631 | 6/1985 | McKinney | 62/323.2 |
| 5,163,302 | 11/1992 | Swadner et al. | 62/244 |
| 5,231,849 | 8/1993 | Rosenblatt | 62/238.3 |
| 5,383,341 | 1/1995 | Zur et al. | 62/476 |

FOREIGN PATENT DOCUMENTS

| | | | |
|---|---|---|---|
| 31818 | 3/1981 | Japan | 62/323.2 |
| 404270869 | 9/1992 | Japan | 62/323.2 |

*Primary Examiner*—William Doerrler
*Attorney, Agent, or Firm*—Charles B. Katz

[57] ABSTRACT

An absorption-type air conditioning process and system for an automobile or other vehicle is disclosed in which the sensible heat from the engine coolant is utilized to drive the generators. The invention, which employs water as the refrigerant and a lithium bromide solution as the absorbent, comprises two successive working solution absorption-generation circuits, the first circuit operating at low-intermediate pressure and the second circuit operating at intermediate-high pressure. An additional feature of the invention is the inclusion of a first and second storage reservoir holding, respectively, chilled refrigerant and concentrated working solution, the incorporation of the reservoirs permitting pre-cooling of the vehicle's interior prior to operation of the vehicle.

8 Claims, 4 Drawing Sheets

VEHICULAR ABSORPTION AIR CONDITIONING PROCESS AND SYSTEM UTILIZING ENGINE COOLANT WASTE HEAT

This application claims benefit of provisional Application Ser. No. 60/001,743, filed Aug. 1, 1995.

FIELD OF THE INVENTION

The present invention relates to an air conditioning process and system for vehicles, and more particularly to an absorption-type vehicular air conditioning process and system which utilizes the sensible waste heat available from the engine coolant to drive the generators.

BACKGROUND OF THE INVENTION

Vehicular air conditioning systems are almost uniformly based on the compression cycle. In a compression system, refrigeration is produced by the repeated process of compression, condensation, expansion and evaporation of a refrigerant, which is a liquid with a relatively high vapor pressure. In order for the compression system to operate, a substantial amount of energy must be supplied to power the compressor, which serves to compress the refrigerant vapor. The energy required to power the compressor can represent up to fifteen percent of an automobile's fuel consumption. Furthermore, the refrigeration effect is reduced when the engine driving the compressor is operating at low revolutions, and no refrigeration is produced at all when the engine is not operating.

An additional drawback to conventional compressor-based air conditioning systems is their widespread utilization of chlorofluorocarbons ("Freon") as the refrigerant. The use of Freon is currently disfavored since it has been shown to be an ozone-destroying agent, and leaking Freon from malfunctioning or junked automotive air conditioners is believed to have a substantial adverse effect on the stratospheric ozone layer. Other less environmentally harmful refrigerant compounds may be substituted for Freon in compression systems, but at a loss of performance and an increase in cost.

The use of the absorption cycle to effect refrigeration has been known for well over one hundred years. The principle of operation of the absorption system is similar to that of the compression system; however, instead of a compressor, the absorption system utilizes a generator filled with a mixture of at least two intermiscible substances (a refrigerant and an absorbent) and an absorber, in which the absorption of the refrigerant by the absorbent occurs. It is necessary to the operation of the absorption system that the refrigerant have a much higher vapor pressure than the absorbent so that when heat is supplied to the generator, the more volatile refrigerant evaporates and flows to the condenser.

Refrigeration in an absorption system is produced by sequential condensation, expansion and evaporation in a manner closely similar to the compression cycle. The principal advantage of the absorption system over the compression system is that due to the substitution of a liquid pump for the compressor, only a small amount of mechanical work is required for operation. The absorption system does, however, require a source of heat to produce evaporation of the refrigerant within the generator. Consequently, absorption systems are well suited to applications where it is inconvenient or inefficient to supply mechanical or electrical power to the refrigeration system, but where a source of heat is readily available.

The prior art contains descriptions of a variety of vehicular refrigeration/air conditioning systems based on the absorption cycle in which the waste heat contained in the engine exhaust gases is utilized to cause evaporation of the refrigerant from the working solution within the generator. Illustrative examples of air conditioning/refrigeration systems of this general description are set forth in U.S. Pat. Nos. 3,661,200 ("Absorption, Refrigeration and Air Conditioning System", issued to McNamara); 5,231,849 ("Dual-Temperature Vehicular Absorption Refrigeration System", issued to Rosenblatt), and; 5,383,341 ("Refrigeration, Heating and Air Conditioning System for Vehicles", issued to Zur et. al.). However, achieving the necessary heat transfer from the exhaust gases to the absorbent-refrigerant mixture can be problematic. The relatively large surface area required for gas-to-liquid heat exchange, coupled with the need to minimize the exhaust gas pressure drop associated with the heat exchanger (since increasing the back pressure of the combustion gases in the engine adversely affects engine performance) results in heat exchanger or generator designs which are expensive, bulky and difficult to install in vehicles.

An alternative source of waste heat in a vehicular engine is available from the engine coolant circuit. Heat received by the circulating coolant (typically a water-ethylene glycol mixture) is normally dissipated to the environment by the vehicle's radiator. A system utilizing the waste heat from the engine coolant is an attractive alternative to systems utilizing heat from the exhaust gases since no bulky gas-to-liquid heat exchanger is required. U.S. Pat. No. 4,307,575 ("Automotive Absorption Air Conditioner Utilizing Solar and Motor Waste Heat", issued to Popinski) teaches an absorption cycle air conditioner system for use in conjunction with an electric-powered vehicle in which heat transferred from the recirculating engine coolant is utilized to evaporate the refrigerant within the generator. However, this system requires additional heat input from a solar collector mounted on the roof of the vehicle to operate. To the best of the applicant's knowledge, the prior art does not include any examples of vehicular absorption air conditioners in which waste heat from the engine coolant is used to thermally drive the generation step without any additional heat input from other sources.

SUMMARY OF THE INVENTION

It is therefore an object of the invention to provide a vehicular absorption air conditioning process and system in which the waste heat available from the engine coolant is utilized to thermally drive the generators.

It is a more specific object of the invention to provide a vehicular absorption air conditioning process and system which employs a compound cycle having multiple absorption-generation circuits thereby permitting efficient use of the relatively low enthalpy heat contained in the engine coolant.

It is another object of the invention to provide a vehicular absorption air conditioning process and system having means of energetic storage permitting pre-cooling of a vehicle prior to its operation.

It is yet another object of the invention to provide a vehicular absorption air conditioning system which may be easily and inexpensively retrofitted to an existing vehicle without extensive modification of the vehicle's cooling systems.

The foregoing as well as other and further objects are achieved by the present invention. The invention comprises a vehicular absorption air conditioning process and system in which sensible heat available from the hot engine coolant is employed to evaporate the refrigerant within the generators. The process utilizes water as the refrigerant and lithium bromide (LiBr) as the absorbent. An essential inventive feature of the process and system disclosed herein is the use of a compound absorption-generation cycle having two working solution (LiBr-water solution) circuits. In operation, relatively low pressure refrigerant vapor from the evaporator flows to a first absorber operating at the same pressure. Within the first absorber, at least a portion of the refrigerant vapor is absorbed into a working solution which is initially lean in refrigerant (i.e. having a high LiBr concentration). The working solution is then pumped to a first generator operating at an intermediate pressure where heat from the engine coolant serves to evaporate a portion of the refrigerant vapor from the working solution. The concentrated (refrigerant-lean) working solution from the first generator is returned to the first absorber to complete the circuit while the refrigerant vapor flows to a second absorber operating at the same pressure as the first generator.

Within the second absorber, at least a portion of the refrigerant vapor is absorbed into a concentrated working solution and is pumped to a second generator operating at relatively high pressure. Heat from the engine coolant is used to evaporate a portion of the refrigerant within the second generator. The concentrated working solution is returned from the second generator to the second absorber, while the refrigerant vapor passes to the condenser, which operates at the same pressure as the second generator. After being condensed inside the condenser, the refrigerant is subsequently expanded through a pressure reducing valve into the evaporator. The evaporation of the liquid refrigerant within the evaporator provides the refrigeration necessary to cool the air entering the vehicle's interior. Low pressure refrigerant vapor then passes to the first absorber, completing the absorption refrigeration cycle.

An additional inventive feature of the process and system is the inclusion of reservoirs incorporated into the condenser and intermediate-pressure generator and which serve to store, respectively, chilled liquid refrigerant and concentrated working solution. The reservoirs permit operation of the air conditioning system for a period of time during which the heat available from the engine coolant is insufficient to produce evaporation of refrigerant in the evaporators.

BRIEF DESCRIPTION OF THE DRAWINGS

FIG. 5 is a pressure-temperature-concentration diagram representing the compound absorption cycle of the present invention.

DETAILED DESCRIPTION OF THE INVENTION

Figure 1:
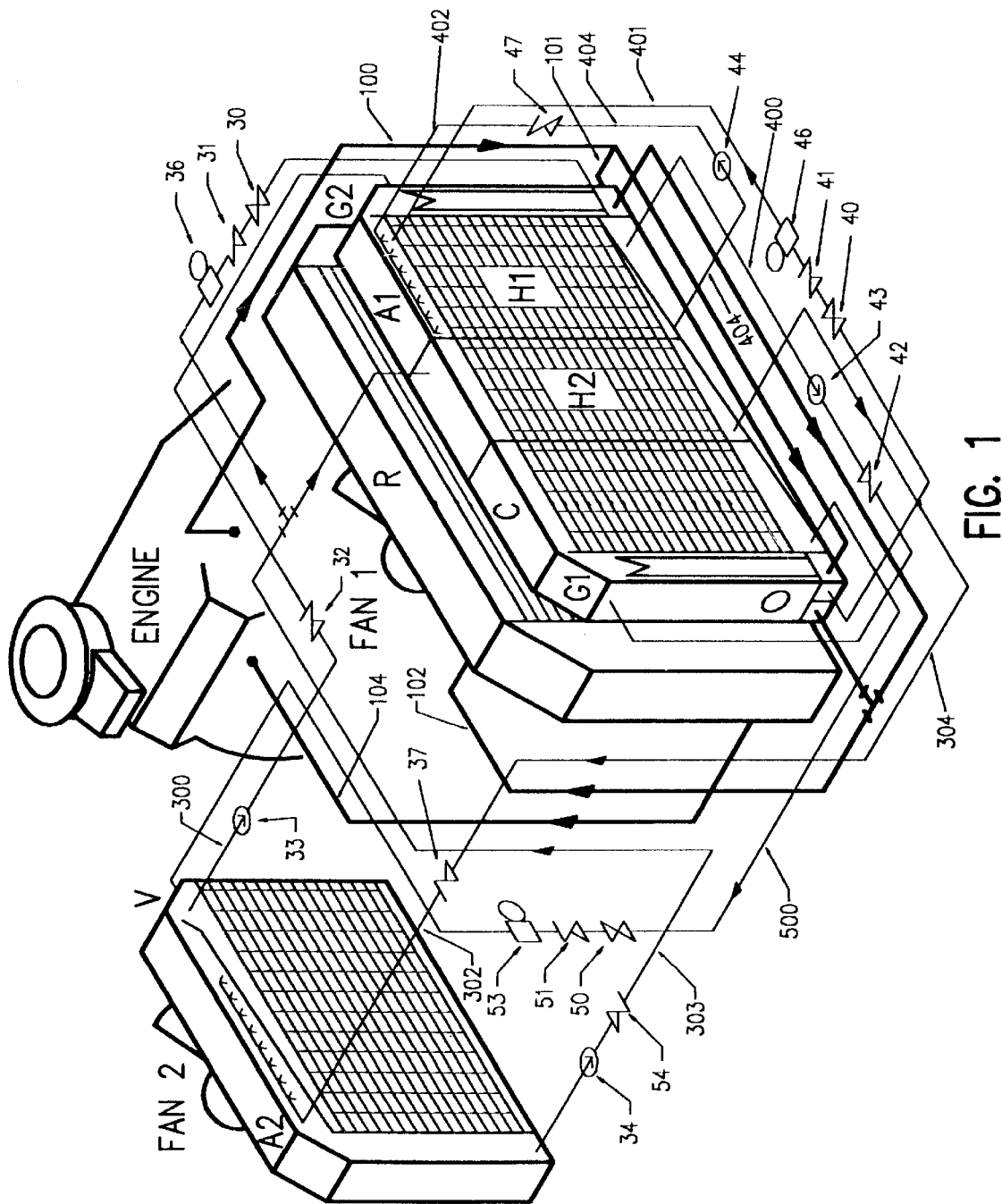
FIG. 1 is a schematic view of the system embodying the present invention including its primary components installed in a vehicular engine compartment.

Referring to FIG. 1, the basic components of the vehicular air conditioning system of the present invention include evaporator V and absorber A2 operating at a relatively low pressure; generator G2 and absorber A1 operating at intermediate pressure, and generator G1 and condenser C operating at a relatively high pressure. In order to reduce transport pressure losses in the system, components representing successive, substantially isobaric steps of the absorption cycle are positioned proximally to one another. As depicted in FIG. 1, the evaporator and low-pressure absorber are combined into a single integrated structure, as are the intermediate-pressure generator and absorber, and the high-pressure generator and condenser. It is noted that the design of the major components of the process and system embodying the invention are well known in the air conditioning/refrigeration art, and so details of the component design are not taught herein. The system further comprises radiator-type heat exchangers H1 and H2, which serve to cool the working solution leaving generators G1 and G2.

The present invention is based on an absorption refrigeration cycle employing water as the refrigerant and the hygroscopic ionic salt LiBr as the absorbent. An essential feature of the invention is the inclusion of dual absorption-generation circuits, the first circuit operating at low-intermediate pressure, and the second circuit operating at intermediate-high pressure. As is disclosed in further detail below, the generators in each circuit are thermally driven by the sensible heat contained in the engine coolant.

Figure 2:
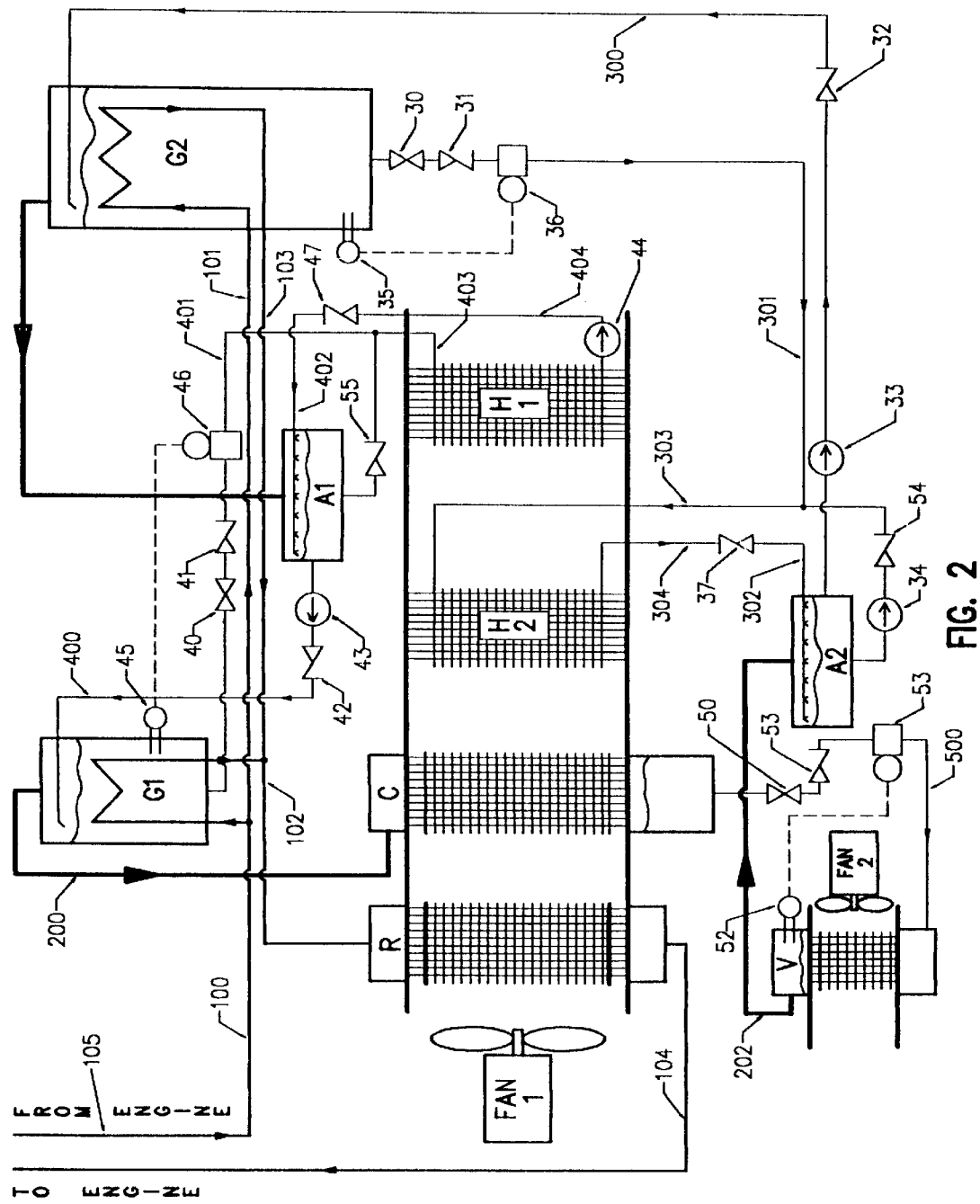
FIG. 2 is a process flow diagram according to the present invention depicting the system under normal (cooling) operating conditions.

Making reference to FIGS. 2 and 5, refrigerant vapor leaving the evaporator flows under a slight negative pressure gradient through line 202 into the low-pressure (typical operating pressure of 0.14 psia (7 mm Hg)) absorber. In the low-pressure absorber, the refrigerant vapor is contacted by droplets of concentrated (i.e. refrigerant-lean) working solution sprayed from at least one nozzle disposed at the top of the absorber. The working solution entering the low-pressure absorber will typically have a LiBr concentration of 56% and a temperature of 86° F. (30° C.). At least a portion of the refrigerant vapor is absorbed by the working solution within the absorber, diluting the LiBr concentration in the working solution to about 52%. The now dilute (i.e. refrigerant-enriched) solution is pumped from the low-pressure absorber through line 300, pump 33 and check valve 32 to the intermediate-pressure generator. The pump increases the pressure of the working solution entering the intermediate-pressure generator from 0.14 psia to about 0.25 psia (13 mm Hg).

Inside the intermediate-pressure generator, heat available from the engine coolant flowing out of the engine block is utilized to evaporate a portion of the refrigerant vapor from the working solution. It is contemplated that heat transfer from the engine coolant to the working solution will be accomplished by immersing a thermally-conductive coil or array of tubes containing the flowing engine coolant in the working solution. The intermediate-pressure generator operates at a temperature of about 114° F. (46° C.), and the concentration of LiBr in the working solution is increased in the generator from 52% to 56%. The concentrated working solution leaving the intermediate-pressure generator flows through pressure reduction valve 30, check valve 31, solenoid valve 36 and lines 301 and 303 into heat exchanger H2, where the temperature of the working solution is reduced to approximately 86° F. (30° C.). The cooled working solution flows from the heat exchanger to the low-pressure absorber through line 304, thereby completing the first (low-intermediate pressure) circuit.

Refrigerant vapor leaving the first generator flows through line 201 under a slight negative pressure gradient to intermediate-pressure absorber A1. In the intermediate-pressure absorber, the refrigerant vapor is contacted by droplets of concentrated working solution sprayed from the top of the absorber. The working solution entering the intermediate-pressure absorber typically has a LiBr concentration of 47% and a temperature of 86° F. (30° C.). At least a portion of the refrigerant vapor is absorbed by the working solution within the absorber, diluting the LiBr concentration to 45%.

The diluted working solution is subsequently pumped by pump 43 through check valve 42 and line 400 to the high-pressure generator. The pump raises the pressure of the working solution to about 0.66 psia (34 mm Hg). Inside the high-pressure generator, heat available from the hot engine coolant is transferred to the working solution to evaporate a portion of the refrigerant therefrom. As with the intermediate-pressure generator, heat transfer from the engine coolant to the working solution will be accomplished by immersing a coil or array of tubes containing the circulating engine coolant in the working solution. The high-pressure generator typically operates at a temperature of 119° F. (48° C.). Concentrated working solution flowing out of the high-pressure generator flows through pressure reduction valve 40, check valve 41, solenoid valve 46 and line 401 into heat exchanger H1, where its temperature is reduced to about 86° F. (30° C.). The cooled working solution flows back into intermediate-pressure absorber A1, thereby completing the second (intermediate-high pressure) circuit.

Refrigerant vapor produced in the high-pressure generator passes through line 200 to condenser C, where the vapor is condensed, giving up its heat of evaporation to the air blown by the condenser exterior by fan 1. The condensed refrigerant subsequently passes through line 500 and its pressure is reduced to approximately 0.14 psia (7 mm Hg) as it flows through expansion valve 50. The refrigerant then flows to evaporator V, which is located inside a duct through which a stream of warm ambient or recirculated air is supplied by air conditioning fan 2. The air gives up a portion of its heat to the refrigerant flowing through the evaporator, thereby cooling the air to a comfortable temperature and causing the refrigerant to return to the vapor state. The evaporator typically operates at a temperature of 43° F. (6° C.). Refrigerant vapor exiting the evaporator flows through line 202 to the low-pressure absorber, completing the refrigeration cycle.

Making reference again to FIG. 2, it is noted that according to the preferred embodiment of the invention, the heated engine coolant leaving the engine block is divided into two parallel streams, the first stream being directed to high-pressure generator G1 and the second stream being directed to intermediate-pressure generator G2. After passing through the generators and yielding a portion of their sensible heat to evaporate the refrigerant, the two streams are re-combined and flow to the radiator R, where the temperature of the coolant is reduced sufficiently to permit effective cooling of the engine block. Alternatively, the engine coolant may be directed in sequence first to intermediate-pressure generator G2 and then to high-pressure generator G1. Circulation of the engine coolant is effected by a standard mechanical or electrical coolant pump.

In accordance with the present invention, an automatic control system is provided for regulating the circulation of refrigerant and working solutions and maintaining the working solution concentrations within acceptable limits. The control system includes conductivity analyzers 35, 45 and 52 (which measure ion concentration as well as detecting the absence of fluid) and solenoid valves 36, 46 and 53. By ensuring that an adequate amount of fluid is present in the generators and condenser and that the LiBr concentration in the working solution is kept below a predetermined maximum value, the control system protects against accidental pressure discharge resulting from low fluid levels and precipitation of LiBr crystals from the working solutions.

Figure 3:
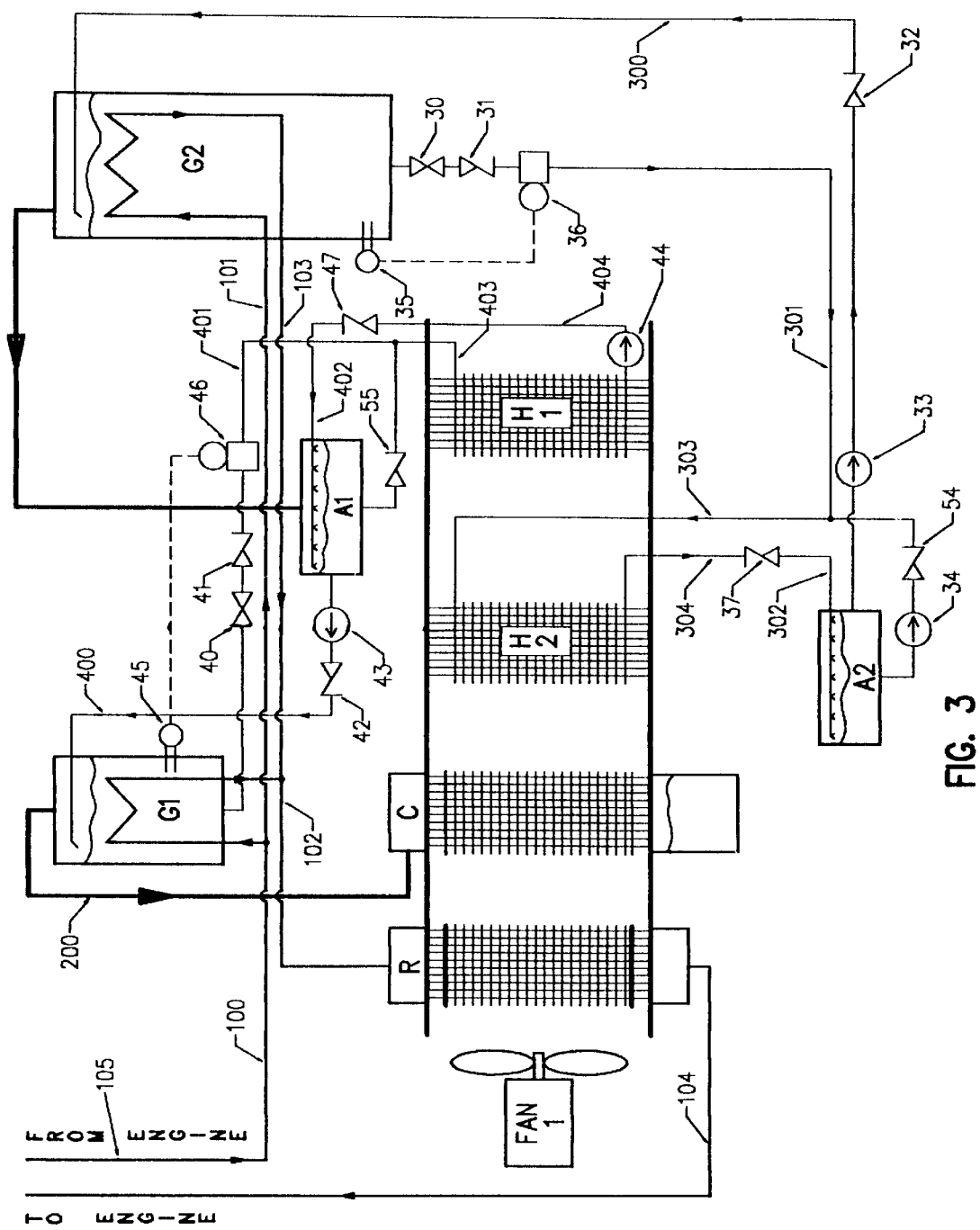
FIG. 3 is a process flow diagram according to the present invention depicting the system under energetic storage (non-cooling) conditions.

An important feature of the present invention is that the system provides means for energetic storage in the form of condensed refrigerant and concentrated working solution. FIG. 3 depicts the system under conditions where the temperature inside the vehicle's passenger compartment has reached the desired setpoint and the cooling fan is rendered temporarily inoperative, thereby eliminating heat transfer from the ducted air stream to the evaporator. Because refrigerant vapor production within the evaporator is minimal under these conditions, little or no vapor passes to the low-pressure absorber. Concentrated working solution arriving at the low-pressure absorber is returned undiluted to the intermediate-pressure generator, which is sized to provide a reservoir for storage of a predetermined volume of working solution. The refrigerant flow control system, comprising conductivity analyzer 52 and solenoid valve 53, controls the flow of refrigerant into the condenser and stores the liquid refrigerant in a reservoir incorporated into the condenser.

Figure 4:
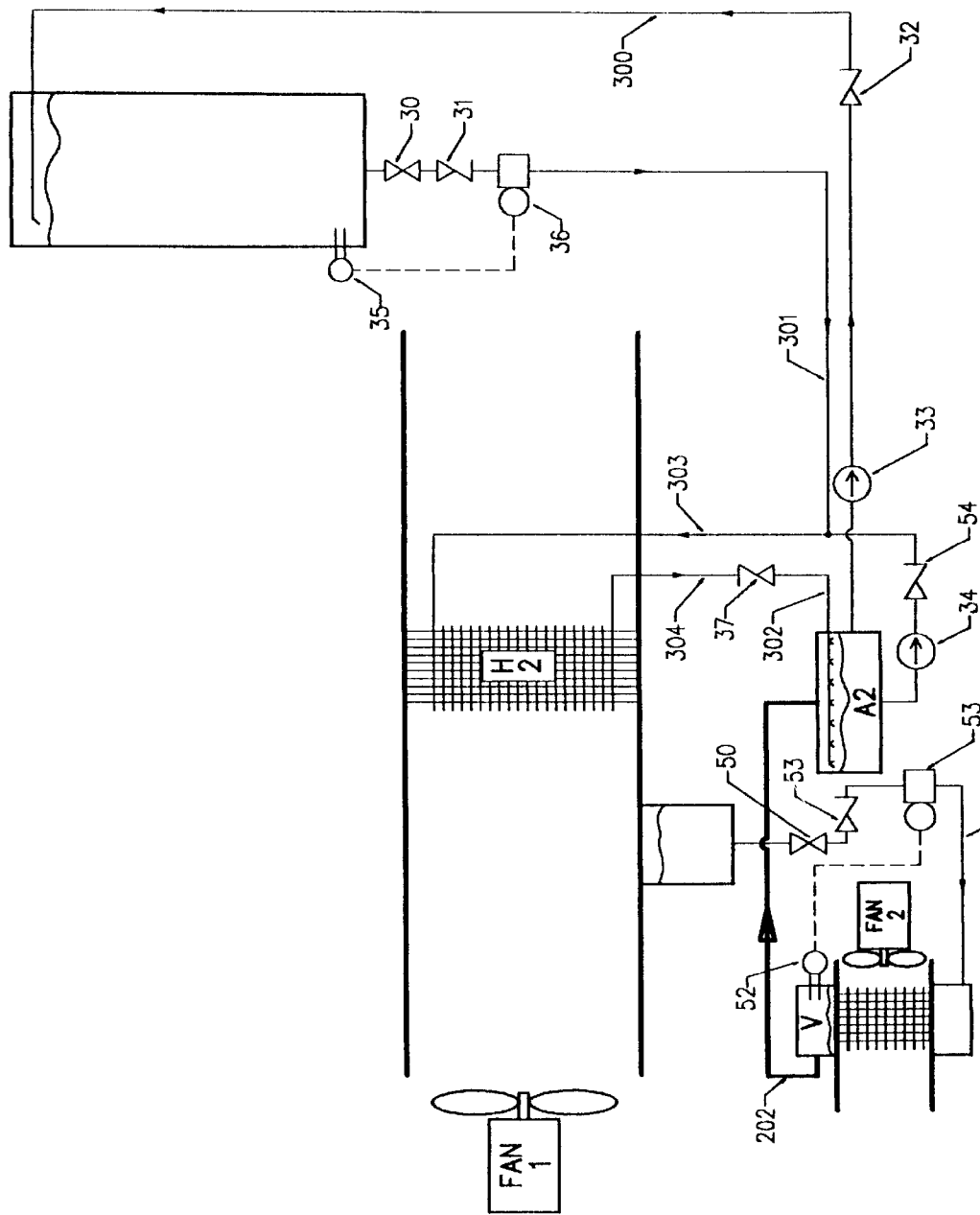
FIG. 4 is a process flow diagram according to the present invention depicting the condition wherein the system is functioning in the absence of thermal transfer from the engine coolant to the generators.

The storage of concentrated working solution and refrigerant in the present invention makes possible the operation of the air conditioning system under conditions where the heat available from the engine coolant is insufficient to thermally drive the generators. For example, after cold-starting the vehicle's engine, it will typically take several minutes before the engine coolant is at a sufficiently high temperature to allow heat transfer to the working solution. FIG. 4 depicts the operation of the air conditioning system under these conditions. Liquid refrigerant stored in the condenser reservoir passes through the expansion valve into the evaporator. Warm air blown by the air conditioning fan produces the evaporation of the refrigerant within the evaporator, which in turn cools the air entering the passenger compartment. The refrigerant vapor then flows to the low-pressure absorber where it is absorbed by the concentrated working solution. The diluted (refrigerant-rich) working solution is then pumped into the intermediate-pressure generator. Inside the intermediate-pressure generator, the lower-density diluted working solution displaces the higher-density concentrated working solution, which flows into the low-pressure absorber. The automatic flow control system comprising conductivity analyzer 35 and solenoid valve 36 controls the circulation and hence the concentration of the working solution. The condenser reservoir and intermediate-pressure generator are sized to store a volume of condensed refrigerant great enough to permit operation of the air conditioning system until the engine coolant has attained a temperature sufficiently high to drive the generators and thereby produce the normal circulation of refrigerant in the system. It has been found that a condenser reservoir capacity of approximately 2.5 liters and an intermediate-pressure generator capacity of 15 liters are sufficient to provide cooling for about one hour with no heat input from the engine coolant. Of course, the capacity of the reservoirs can be adjusted to provide the desired period of cooling without engine coolant heat input to the system.

It is additionally noted that the inclusion of the condenser reservoir permits pre-cooling of the vehicle's interior prior to starting the vehicle's engine. To achieve this result, the air conditioning system will typically comprise means for automatically or remotely actuating its operation. The foregoing means may comprise a remote control device which transmits a radio or infrared signal to a receiver in electrical association with the air conditioning system. Alternatively, the means for automatically actuating the air conditioning system may comprise a timer which initiates the operation of the air conditioner at a predetermined time. Thus, by either means, the vehicle's interior may be cooled to a comfortable temperature before the driver and passengers get inside the vehicle.

While preferred embodiments of the process and system according to the present invention have been described and depicted herein, it will be apparent to those skilled in the art that various modifications may be made in these embodiments without departing from the spirit of the present invention. For that reason, the scope of the invention is set forth in the following claims.

What is claimed is:

1. In combination with a vehicle having a recirculating liquid engine coolant, an absorption cycle air-conditioning process for cooling the passenger compartment of said vehicle, said process utilizing a refrigerant consisting essentially of water and an absorbent consisting essentially of lithium bromide, said absorbent and said refrigerant being intermiscible to form working solutions of variable concentration, said process comprising the steps of:

(a) at relatively low pressure, contacting at least a portion of said refrigerant with a first working solution to absorb at least a portion of said refrigerant into said first working solution, said refrigerant being initially in vapor phase;

(b) pumping said first working solution to an area of intermediate pressure;

(c) utilizing a portion of the heat available from said engine coolant to desorb as vapor at least a portion of said refrigerant from said first working solution;

(d) passing said first working solution resulting from step (c) through a first pressure reduction valve and a first heat exchanger, thereby reducing pressure and temperature to the operating conditions of step (a);

(e) returning said first working solution to step (a) to complete the first working solution circuit;

(f) at said intermediate pressure, contacting at least a portion of the refrigerant vapor from step (c) with a second working solution to absorb at least a portion of said refrigerant vapor into said second working solution;

(g) pumping said second working solution to an area of relatively high pressure;

(h) utilizing a portion of the heat available from said engine coolant to desorb as vapor at least a portion of said refrigerant from said second working solution;

(i) passing said second working solution resulting from step (h) through a second expansion valve and a second heat exchanger, thereby reducing pressure and temperature to the operating conditions of step (f);

(j) returning said second working solution to step (f) to complete the second working solution circuit;

(k) condensing at least a portion of the refrigerant vapor from step (h) at relatively high pressure;

(l) passing the resultant liquid refrigerant to an area of relatively low pressure;

(m) directing a flow of relatively warm air past said liquid refrigerant thereby cooling said air flow and vaporizing at least a portion of said liquid refrigerant, and;

(n) passing the resultant refrigerant vapor to step (a).

2. An absorption cycle air conditioning process according to claim 1 wherein the operating pressure of steps (a), (m) and (n) is approximately 0.14 psia (7 mm Hg), the operating pressure of steps (c) and (f) is approximately 0.25 psia (13 mm Hg), and the operating pressure of steps (h) and (k) is approximately 0.66 psia (34 mm Hg).

3. An absorption cycle air conditioning process according to claim 1, further comprising the steps of:

storing in a reservoir a portion of said liquid refrigerant resulting from step (k), and;

storing in a reservoir a portion of said first working solution resulting from steps (a) and (b);

whereby a stored volume of said liquid refrigerant and a stored volume of said working solution are available to enable the cooling operation of said air conditioning process under conditions where the heat available from said engine coolant is insufficient to produce desorption of said refrigerant in steps(c) and (h).

4. In combination with a vehicle having a recirculating liquid engine coolant, an absorption cycle air-conditioning system for cooling the passenger compartment of said vehicle, said system utilizing a refrigerant consisting essentially of water and an absorbent consisting essentially of lithium bromide, said absorbent and said refrigerant being intermiscible to form working solutions of variable concentration, said system comprising:

first absorber means for absorbing at least a portion of said refrigerant into a first working solution, said first absorber means operating at relatively low pressure;

first generator means connected to said first absorber means for desorbing as vapor at least a portion of said refrigerant from said first working solution produced in said first absorber means;

first pumping means interposed between said first absorber means and said first generator means for raising said first working solution to an intermediate pressure;

means for returning said first working solution produced in said first generator means to said first absorber means at reduced pressure and temperature;

second absorber means connected to said first generator means for absorbing at least a portion of the refrigerant vapor produced in said first generator means into a second working solution;

second generator means connected to said second absorber means for desorbing as vapor at least a portion of said refrigerant from said second working solution produced in said second absorber means;

second pumping means interposed between said second absorber means and said second generator means for raising said second working solution to a relatively high pressure;

means for returning said second working solution produced in said second generator means to said second absorber means at reduced pressure and temperature;

condenser means connected to said second generator means for condensing at relatively high pressure the refrigerant vapor produced in said second generator means;

pressure reduction means connected to said condenser means for reducing the liquid refrigerant produced by said condenser means to a relatively low pressure;

evaporator means for evaporating at relatively low pressure the liquid refrigerant flowing from said pressure reduction means, said evaporator means including means for transferring the heat available from a flowing air stream to said liquid refrigerant thereby causing its evaporation;

means for connecting said evaporator means to said first absorber means, and;

means for transferring the heat available from said engine coolant to said first and second generator means.

5. A vehicular absorption air conditioning system according to claim 4 wherein said condenser means includes a reservoir for storing a predetermined volume of liquid refrigerant, and said first generator means includes a reservoir for storing a predetermined volume of concentrated working solution whereby predetermined volumes of said liquid refrigerant and of said concentrated working solution are available to enable the cooling operation of said air conditioning system under conditions where insufficient heat is available from said engine coolant to thermally drive said first and second generator means.

6. A vehicular absorption air conditioning system according to claim 4 wherein said means for transferring the heat available from said engine coolant to said first and second generator means comprises:

at least one tube containing said engine coolant disposed within said first generator means and having its outer surface in contact with said first working solution contained within said first generator means, said tube being fabricated from thermally conductive material enabling the transfer of heat from said engine coolant to said first working solution, and;

at least one tube containing said engine coolant disposed within said second generator means and having its outer surface in contact with said second working solution contained within said second generator means, said tube being fabricated from thermally conductive material enabling the transfer of heat from said engine coolant to said second working solution, and;

means for passing said engine coolant from the engine to said tubes and returning it to said engine.

7. A vehicular air conditioning system according to claim 5 further comprising means for remotely actuating the operation of said air conditioning system so as to enable pre-cooling of said vehicle prior to starting the engine of said vehicle.

8. A vehicular air conditioning system according to claim 5 further comprising timer means in electrical association with said air conditioning system for automatically actuating the operation of said air conditioning system at a predetermined time.

\* \* \* \* \*